United States Patent [19]

Suzuki

[11] Patent Number: 4,890,516
[45] Date of Patent: Jan. 2, 1990

[54] RATIO CONTROL SYSTEM FOR CONTINUOUSLY VARIABLE TRANSMISSION

[75] Inventor: Yutaka Suzuki, Hatano, Japan

[73] Assignee: Nissan Motor Co., Ltd., Yokohama, Japan

[21] Appl. No.: 121,564

[22] Filed: Nov. 16, 1987

[30] Foreign Application Priority Data

Nov. 18, 1986 [JP] Japan .................. 61-274930

[51] Int. Cl.⁴ .................................. B60K 41/12
[52] U.S. Cl. ........................... 74/866; 74/860
[58] Field of Search .................. 74/866, 867, 853, 860, 74/863; 364/424.1; 474/12

[56] References Cited

U.S. PATENT DOCUMENTS

| | | | |
|---|---|---|---|
| 4,543,077 | 9/1985 | Yamamuro et al. | 474/12 |
| 4,597,308 | 7/1986 | Tanaka et al. | 74/866 |
| 4,627,311 | 12/1986 | Yokooku et al. | 74/866 |
| 4,637,279 | 1/1987 | Itoh et al. | 74/866 |
| 4,656,587 | 4/1987 | Osanai et al. | 74/866 X |
| 4,727,771 | 3/1988 | Niwa et al. | 74/866 |
| 4,735,112 | 4/1988 | Osanai et al. | 74/866 |
| 4,735,113 | 4/1988 | Yamamuro et al. | 74/866 |
| 4,735,114 | 4/1988 | Satoh et al. | 74/866 |
| 4,753,133 | 6/1988 | Itoh et al. | 74/866 |

FOREIGN PATENT DOCUMENTS 61-105351 5/1986 Japan .

Primary Examiner—Dwight G. Diehl
Attorney, Agent, or Firm—Foley & Lardner, Schwartz, Jeffery, Schwaab, Mack, Blumenthal & Evans

[57] ABSTRACT

In order to prevent unnecessary variations in reduction ratio during cyclic depression and release of an accelerator pedal, there is provided a non-linear control element in a control unit for varying a reduction ratio of the continuously variable transmission. The non-linear control element provides a hysteresis between an engine power demand variable with the accelerator pedal and the reduction ratio.

12 Claims, 14 Drawing Sheets 4,890,516

RATIO CONTROL SYSTEM FOR CONTINUOUSLY VARIABLE TRANSMISSION

BACKGROUND OF THE PRESENT INVENTION

The present invention relates to a ratio control system for a continuously variable transmission drivingly connected to an engine of a motor vehicle having a manually operable accelerator. The engine has a throttle operatively connected to the accelerator such that the throttle opens in degrees as the accelerator is depressed.

A continuously variable transmission including a fluid coupling and a pulley unit with a V-belt is known from a Japanese patent application No. 59-226706 laid open for public inspection under JP 61-105351 or a copending U.S. patent application No. 922,400 filed Oct. 23, 1986 (now U.S. Pat. No. 4,735,113 issued on Apr. 5, 1988 to Yamamuro et al.) and commonly assigned herewith. In this known continuously variable transmission, the pulley unit is hydraulically actuated by a shift control valve that is operatively linked via a shift operation mechanism to a shift actuator. The shift actuator is controlled by a microcomputer based control unit which receives various input information signals including an engine revolution speed signal, a vehicle speed signal and a throttle opening degree signal. Among them the vehicle speed signal and the throttle opening degree signal are used to determine a target engine revolution speed and produces an output signal based on a result of comparison between the actual engine revolution speed indicated by the engine revolution speed signal and the target engine revolution speed signal. The actuator under the command of the output signal actuates the shift control valve to thereby regulate the fluid supply to and fluid discharge from a driver pulley of the pulley unit in order to adjust a speed ratio in such a direction as to reduce a difference between the actual engine speed and the target engine speed toward zero.

The control characteristic of this known ratio control system is illustrated by a linear throttle opening degree TVO versus a reduction ratio i characteristic as shown in FIG. 14. According to this characteristic, cyclic depression of an accelerator pedal and release of the acelerator pedal causes a substantial variation in an output shaft torque of the transmission. Such cyclic depression and release of the accelerator pedal is required when a vehicle operator wishes to maintain a certain vehicle speed against varying running resistance. This torque variation is uncomfortable to passengers and the operator of the vehicle, and in effect decreases ride comfort.

Describing in detail, as shown in FIG. 14, a small change (dTVO) in the throttle opening degree TVO causes a change (di) in the reduction ratio i. Referring also to FIG. 15 which shows an engine torque versus throttle opening degree characteristic curve with a constant engine revolution speed, the small change in the throttle opening degree causes a change dTE in the engine torque. Thus, since a change in the transmission output torque is the product of the change di in the reduction ratio and the change dTE in the engine torque, this change (di×dTE) in the transmission output torque will have a substantially large value.

An object of the present invention is therefore to provide a reduction ratio control system which assures smooth operation and thus increases riding comfort.

A specific object of the present invention is to provide a reduction ratio control system which can prevent unnecessary variations in reduction ratio of a continuously variable transmission during cyclic depression and release operation of an accelerator pedal.

SUMMARY OF THE INVENTION

According to the present invention, there is provided a non-linear control element in a control unit for varying a reduction ratio of the continuously variable transmission in response at least to a power demand on the engine drivingly coupled with the continuously variable transmission.

More specifically, the non-linear control element provides a hysteresis between an input where a sensor output signal indicative of a power demand on the engine is impressed and an output based on which a shift actuator of the continuously variable transmission is actuated, so that there is a difference between the increasing input value and the decreasing input value that effect the same output value, and if the direction of a change in the input value is different from the direction of the prior change and the magnitude of this change is less than the hysteresis width, this change does not cause any change in the output value.

Preferrably, the hysteresis width is variable with the vehicle speed.

DETAILED DESCRIPTION OF THE INVENTION

Figure 1:
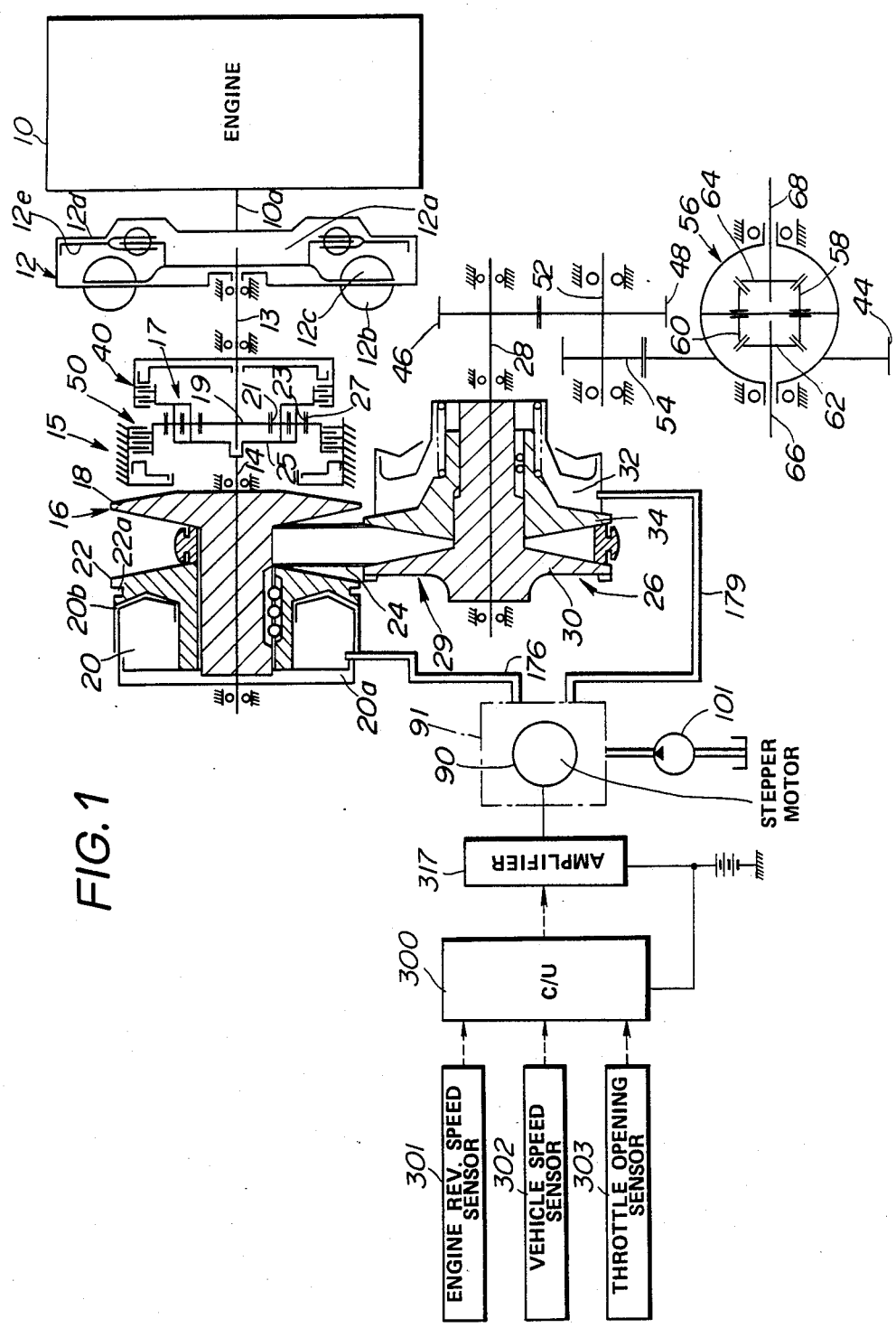
FIG. 1 is a continuously variable transmission of an automotive vehicle with a ratio control system therefor shown in block diagram.

Referring now to FIG. 1, an engine 10 of an automotive vehicle is shown. The engine 10 has an output shaft 10a coupled with a fluid coupling 12 including a pump impeller 12b and a turbine runner 12c, and a lock-up mechanism. The lock-up mechanism includes a friction clutch element 12d rotatable with the turbine runner 12c. The clutch element 12d divides the inside of the fluid coupling 12 into two chambers and defines a lock-up chamber 12a. When it is in the illustrated position in FIG. 1, clutch element 12d is disengaged from the adjacent end wall 12e rotatable with pump impeller 12b. This illustrated position is established when hydraulic fluid is supplied to the lock-up chamber 12a. The hydraulic fluid is then allowed to pass through a clearance 12f formed around the outer periphery of the clutch element 12d to flow into the inside of the fluid coupling 12. When the hydraulic fluid is discharged from the lock-up chamber 12a and the hydraulic fluid is supplied directly into the inside of the fluid coupling 12, there occurs a pressure difference across the clutch element 12d urging same into firm engagement with the adjacent wall 12e. The turbine runner 12c of the fluid coupling 12 is coupled with a rotary shaft 13. The rotary shaft 13 is coupled with a forward/reverse drive change-over mechanism 15. The forward/reverse drive change-over mechanism 15 has a planetary gearing 17, a forward clutch 40, and a reverse brake 50. The planetary gearing 17 comprises a sun gear 19, a pinion carrier 25 having two pinions 21, 23, and a ring gear 27. The two pinions 21, 23 are intermeshed, the pinion 21 meshes with the sun gear 19, and the pinion 23 meshes with the ring gear 27. The sun gear 19 is connected to the rotary shaft 13 for unitary rotation therewith. The pinion carrier 25 is selectively connected to the rotary shaft 13 via the forward clutch 40. The ring gear 27 is selectively held stationary via the reverse brake 50. The pinion carrier 25 is connected to a driver shaft 14 arranged coaxially with the rotary shaft 13. Mounted on the driver shaft 14 is a driver pulley 16. The driver pulley 16 comprises an axially stationary conical disk 18, and an axially movable conical disk 22 that is arranged in opposed relationship with axially stationary conical disk 18 so as to define a V-shaped pulley groove therebetween and displaceable in axial direction of driver shaft 14 under bias of hydraulic fluid pressure applied to a driver pulley cylinder chamber 20 (servo chamber). The driver pulley cylinder chamber 20 comprises two chambers 20a and 20b, and has a pressure acting area twice as large as a pressure acting area of a later described follower pulley cylinder chamber 32 (servo chamber). The driver pulley 16 is drivingly connected to a follower pulley 26 via a V-belt 24. The follower pulley 26 is mounted on a follower shaft 28. The follower pulley 26 comprises an axially stationary conical disk 30 rotatable with the follower shaft 28, and an axially movable conical disk 34 that is arranged in opposed relationship with the axially stationary conical disk 30 so as to define a V-shaped pulley groove and displaceable in axial direction of the follower shaft 28 under the bias of a hydraulic fluid pressure applied to the follower pulley cylinder chamber 32. The driver pulley 16, V-belt 24, and follower pulley 26 cooperate with each other to constitute a continuously variable V-belt transmission mechanism 29. Fixedly connected to the follower shaft 28 is a driver gear 46 which is in mesh with an idler gear 48 rotatable with an idler shaft 52. The idler shaft 52 has a pinion 54 rotatable therewith, the pinion 54 being in mesh with a final gear 44. A pair of pinions 58 and 60 that form a part of a differential 56 are fixedly connected to the final gear 44 for rotation therewith. The pinions 58, 60 are in mesh with a pair of side gears 62, 64, respectively, which are fixedly coupled with a pair of axles 66, 68, respectively. The axles 66, 68 are connected to road wheels of an automotive vehicle, respectively.

An engine torque on the engine output shaft 10a is transferred via the fluid coupling 12 and the rotary shaft 13 to the forward/reverse drive change-over mechanism 15 where the direction of the torque is switched, if necessary. With the forward clutch 40 engaged and the reverse brake 50 released, the torque of the rotary shaft 13 is transferred via the planetary gearing 17 to drive same in the forward direction. With the forward clutch 40 released and the reverse brake 50 engaged, the planetary gearing 17 acts to change the direction of the torque and transfers the torque of the rotary shaft 13 to the driver shaft 14 to drive same in the reverse direction. The torque transferred to the driver shaft 14 is transferred via driver pulley 16, V-belt 24, follower pulley 26, follower shaft 28, driver gear 46, idler gear 48, idler shaft 52, pinion gear 54, and final gear 44, differential 56 to the axles 66, 68. When both the forward clutch 40 and the reverse brake 50 are released, the transmission of torque is interrupted. A ratio of rotation between the driver pulley 16 and the follower pulley 26 is variable by altering the running diameter of the V-belt 24 on the driver pulley 16 and that of the V-belt 24 on the follower pulley 26.

Figure 2A:
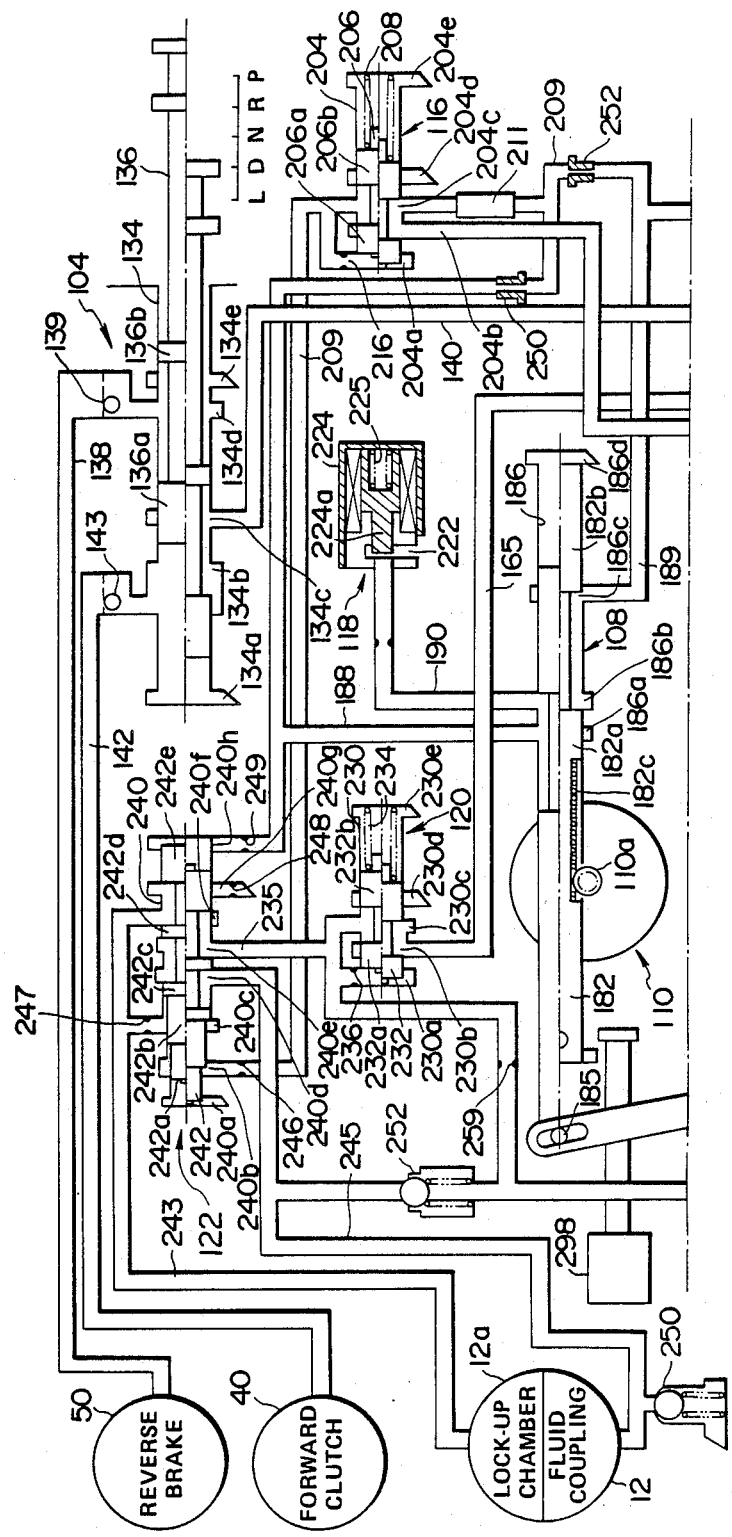
FIGS. 2A and 2B, when combined, illustrate a detailed control circuit for the continuously variable transmission.
Figure 2B:
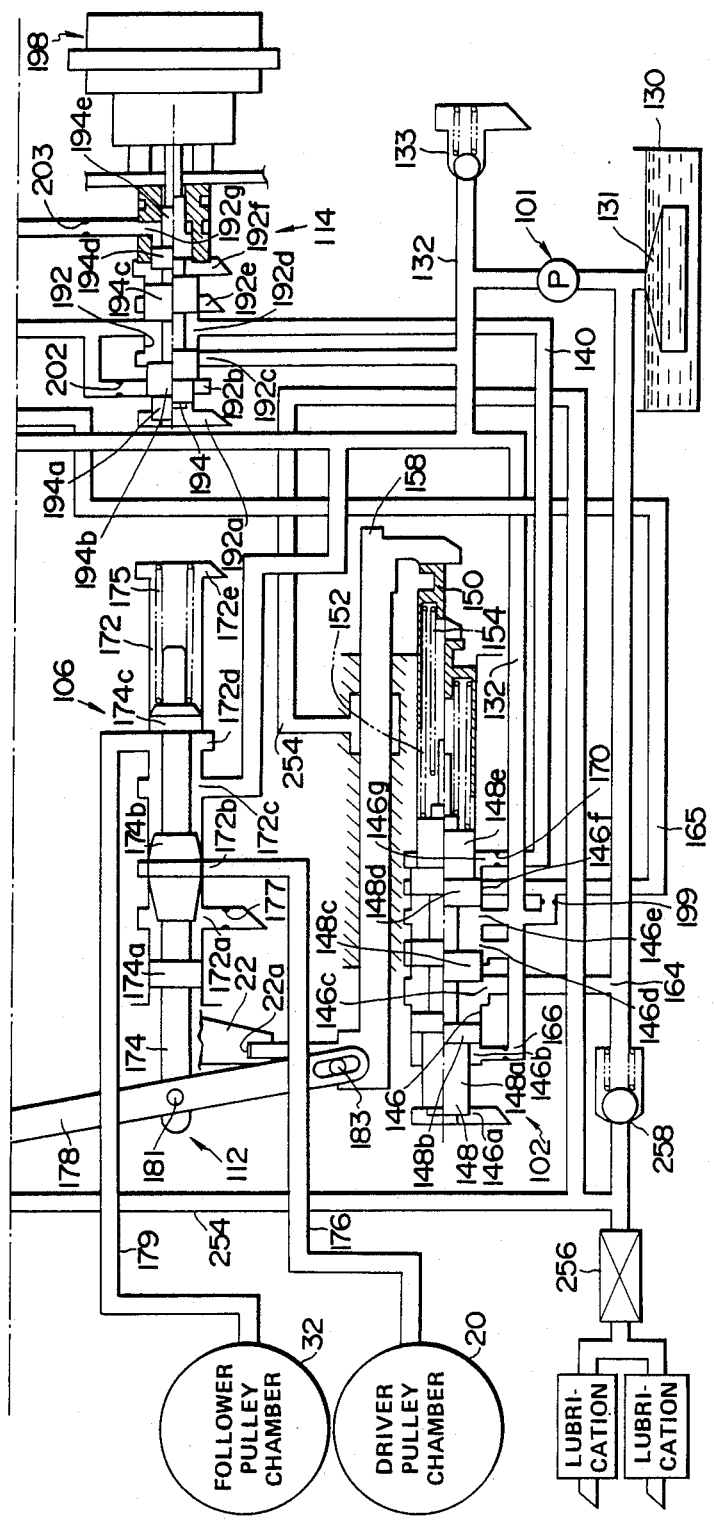

Hereinafter, a hydraulic pressure control system for the above mentioned continuously variable transmission is described. As shown in FIGS. 2A and 2B, it comprises a hydraulic fluid pump 101, a line pressure regulator valve 102, a manual valve 104, a shift control valve 106, an adjustment pressure change-over valve 108, a shift motor 110, a shift operation mechanism 112, a throttle valve 114, a constant pressure regulator valve 116, a solenoid operated valve 118, a coupling pressure regulator valve 120, and a lock-up control valve 122.

The hydraulic fluid pump 101 draws in hydraulic fluid (oil) from a tank 130 via a strainer 131, and discharges it into a hydraulic fluid line 132. Hydraulic fluid line 132 conducts the discharged fluid to ports 146b, 146d and 146e of the line pressure regulator valve 102 where pressure regulation is effected to generate a line pressure. The hydraulic fluid line 132 is allowed to communicate with a port 192c of the throttle valve 114 and a port 172c of the shift control valve 106. The fluid line 132 communicates also with a port 204b of the constant pressure regulator valve 116. Provided in the fluid line 132 is a line pressure relief valve 133 that prevents abnormal increase in the line pressure.

The manual valve 104 has a valve bore 134, formed within a valve body, that is provided with five ports 134a, 134b, 134c, 134d, and 134e, and a spool 136 having two lands 136a and 136b which cooperate with the valve bore 134. The spool 136 which is urged to move by a selector lever (not shown), has five detent positions, namely P, R, N, D, and L range positions. The ports 134a and 134e are drain ports, and the port 134b communicates with the forward clutch 40 via the hydraulic fluid line 142. The hydraulic fluid line 142 is provided with a one-way orifice 143 that provides a throttling effect only when hydraulic fluid is supplied to the forward clutch 40. The port 134c communicates via a hydraulic fluid line 140 with ports 192b and 192d of the throttle valve 114, and the port 134d communicates via a hydraulic fluid line 138 with the reverse brake 50. The hydraulic fluid line 138 is provided with a one-way orifice 139 that provides a throttling effect only when the hydraulic fluid is supplied to the reverse brake 50. When the spool 136 assumes the P range position, the land 136a closes the port 134c that is supplied with the throttle pressure via the hydraulic fluid line 140 from the throttle valve 114 (clutch pressure regulator valve), the forward clutch 40 is drained via a hydraulic fluid line 142 and the drain port 134a, and the reverse brake 50 is drained via a hydraulic fluid line 138 and the drain port 134e. When the spool 136 assumes the R range position, the ports 134c and 134d are allowed to communicate with each other via a space within the valve bore 134 defined between the lands 136a and 136b, and thus the reverse brake 50 is supplied with the throttle pressure, whereas the forward clutch 40 is drained via the port 134a. When the spool 136 assumes the N position, the port 134c is positioned between the lands 136a and 136b, and thus it is prevented from communicating with the other ports, whereas the ports 134b and 134d are drained, so that the reverse brake 50 and the forward clutch 40 are both drained. When the spool 136 assumes the D or L range position, the ports 134b and 134c are allowed to communicate with each other via the space within the valve bore 134 defined between the lands 136a and 136b, allowing supply of the throttle pressure to the forward clutch 40, whereas the reverse brake 50 is drained via port 134e.

The line pressure regulator valve 102 has a valve bore 146, formed within the valve body, that is provided with seven ports 146a, 146b, 146c, 146d, 146e, 146f, and 146g, and a spool 148 having five lands 148a, 148b, 148c, 148d, and 148e which cooperate with valve bore 146, a sleeve 150 axially movable within valve bore 146, and two coaxially arranged springs 152 and 154 that are disposed between the spool 148 and the sleeve 150. The sleeve 150 in abutting engagement with a bias member 158 is urged to move to the left as viewed in FIGS. 2A and 2B in response to the leftward movement of the bias member 158. The bias member 158 is mounted within the valve body in parallel to the axis of the valve bore 146, and it is formed, at the opposite end portion, with an integral arm meshing with a circumferential groove 22a with which the axially movable conical disk 22 of the driver pulley 16 is formed. Arrangement is such that an increase in reduction ratio causes movement of the sleeve 150 to the left as viewed in FIGS. 2A and 2B, whereas a decrease in reduction ratio causes movement of the sleeve 150 to the right as viewed in FIGS. 2A and 2B. Among two springs 152 and 154, the spring 152 arranged outside has opposite ends thereof always engaged by the sleeve 150 and the spool 148 and thus is always in its compressed state, whereas the spring 154 inside is not compressed until the sleeve 150 is moved to the left from a position indicated by the upper half thereof by a predetermined distance.

The port 146a of the line pressure regulator valve 102 is a drain port. The port 146g is supplied with the throttle pressure from the hydraulic fluid line 140 that serves as a throttle pressure circuit. The port 146c communicates with the hydraulic fluid line 164 that serves as a drain circuit. The ports 146b, 146d, and 146e communicate with the hydraulic fluid line 132 that serves as a line pressure circuit. The port 146f communicates via a hydraulic fluid line 165 with a port 230b of the coupling pressure regulator valve 120. The hydraulic fluid line 165 communicates with the fluid line 132 via an orifice 199. Inlets to the ports 146b and 146g are provided with orifices 166 and 170, respectively. As will now be understood, the spool 148 of line pressure regulator valve 102 is subject to two forces directed to the left as viewed in FIGS. 2A and 2B, one due to the spring 152 alone (or both of the springs 152 and 154) and the other resulting from the hydraulic fluid pressure (throttle pressure) supplied to the port 146g to act on a differential area between the lands 148d and 148e, and it is also subject to a force directed to the right as viewed in FIGS. 2A and 2B resulting from the hydraulic fluid pressure (line pressure) supplied to the port 146b to act on a differential area between the lands 148a and 148b. Thus, the spool 148 effects pressure regulation to generate the line pressure by adjusting the amount of flow of hydraulic fluid from the port 146d toward the port 146c until equilibrium state is established wherein the above mentioned forces directed to the left and to the right balance with each other. The characteristic of the line pressure is such that it increases as the reduction ratio becomes large, and it increases also in response to an increase in throttle pressure supplied to the port 146g. The above-mentioned characteristic of the line pressure meets the demand that a force with which the pulley discs grip the V-belt be increased as the reduction ratio becomes large and the engine output torque increases.

The shift control valve 106 has a valve bore 172, formed within the valve body, that is provided with five ports 172a, 172b, 172c, 172d, and 172e, and a spool 174 having three lands 174a, 174b, and 174c which cooperate with valve bore 172, and a spring 175 biasing the spool 174 to the left as viewed in FIGS. 2A and 2B. The port 172b communicates via a hydraulic fluid line 176 with the driver pulley cylinder chamber 20, and the ports 172a and 172e are drain ports. The outlet of the port 172a is provided with an orifice 177. The port 172d communicates via a hydraulic fluid line 179 with the follower pulley cylinder chamber 32. The port 172c communicates with the hydraulic fluid line 132 that serves as the line pressure circuit, and thus supplied with the line pressure. Left end of the spool 174 is rotatably mounted on a lever 178 of the shift operation mechanism 112 by a pin 181 at a generally middle portion thereof. Because the land 174b has an axial cross sectional configuration defined by a curved boundary, hydraulic fluid supplied to the port 172c at line pressure mainly flows into the port 172b, but it is partially discharged to the port 172a. As a result, hydraulic pressure developed in the port 172b is determined by a ratio of the amount of incoming flow into this port to the amount of discharging flow. Thus, the leftward movement of the spool 174 causes a decrease in clearance disposed on the discharge side and an increase in clearance disposed on the line pressure side, resulting in an increase in hydraulic pressure developed in the port 172b.

Usually, the port 172d is supplied with the line pressure applied to port 172c. The hydraulic pressure at the port 172b is supplied via the hydraulic fluid line 176 to the driver pulley cylinder chamber 20, whereas the hydraulic pressure at the port 172d is supplied via the hydraulic fluid line 179 to the follower pulley cylinder chamber 32. As a result, the leftward movement of spool 174 causes an increase in the hydraulic pressure in the driver pulley cylinder chamber 20, resulting in a decrease in width of the V-shaped pulley groove of driver pulley 16. That is, this causes an increase in running diameter of the V-belt 24 on the driver pulley 16, and a decrease in running diameter of the V-belt 26 on the follower pulley 26, thus causing a decrease in reduction ratio. Rightward movement of spool 174 causes the reverse process to take place, thus causing an increase in reduction ratio.

Although, as mentioned before, the lever 178 of shift operation mechanism 112 has a middle portion thereof connected to the spool 174 by the pin 181 and has one end connected to the before mentioned bias member 158 by the pin 183, the opposite end of the lever 178 is connected to a rod 182 by a pin 185. The rod 182 is formed with a rack 182c that meshes with a pinion 110a of the shift motor 110. With this shift operation mechanism 112, if the pinion 110a of the shift motor 110 that is subject to control of the control unit 300 is rotated in such a direction as to cause the rod 182 to move to the right as viewed in FIGS. 2A and 2B, this rightward movement of the rod 182 causes the lever 178 to swing about the pin 183 clockwise, thus urging the spool 174 of the shift control valve 106 for moving to the right. As described previously, this causes the axially movable conical disc 22 of the driver pulley 16 to move to the left as viewed in FIGS. 2A and 2B, thus causing an increase in width of the V-shaped pulley groove of driver pulley 16, resulting in an increase in reduction ratio. Because the one end of the lever 178 is linked to the bias member 158 by the pin 183, the above mentioned movement of the axially movable conical disk 22 causes the bias member 158 to move to the left as viewed in FIGS. 2A and 2B. This leftward movement of the bias member 158 causes the lever 178 to swing about the pin 185 disposed on the other end thereof clockwise. Thus, the spool 174 is pulled back to the left, tending to cause a decrease in reduction ratio.

After repeating this process, the spool 174, the driver pulley 16, and the follower pulley 26 establish a new stable reduction ratio state corresponding to a new operating position assumed by the shift motor 110. If the shift motor 110 is rotated in the opposite direction so as to urge the rod 182 to the left, this leftward movement of the rod 182 causes the associated members to move until they assume a new stable reduction ratio state corresponding to a new rotary position of shift motor 110. The rod 182 is movable beyond the position corresponding to the maximum reduction ratio and further to the right, as viewed in FIGS. 2A and 2B, into an overstroke range. This movement of the rod 182 into the overstroke range will turn on a change-over detection switch 298. From the preceding description, it will now be understood that if the shift motor 110 is rotated in accordance with a predetermined pattern, the reduction ratio will vary accordingly, so that it is possible to control the reduction ratio of the continuously variable transmission by the shift motor 110.

The shift motor 110 (which will be hereinafter called as "stepper motor") is so controlled as to assume an operating position that is determined by the control unit 300.

The adjustment pressure change-over valve 108 has a valve element thereof formed integrally with the rod 182 of the shift operation mechanism 112. That is, the adjustment pressure change-over valve 108 has a valve bore 186, formed within the valve body, that is provided with ports 186a, 186b, 186c, and 186d, and lands 182a and 182b formed on the rod 182. The port 186a communicates with a hydraulic fluid line 188. The port 186b communicates with the solenoid operated valve 118 via a drain conduit 190. The port 186c communicates with a hydraulic fluid line 189. The port 186d is a drain port. Normally, the port 186a and the port 186b are allowed to communicate with each other via a space defined within the valve bore between the lands 182a and 182b, but when the rod 182 is displaced into the overstroke range beyond the maximum reduction ratio corresponding position, the port 186a is closed and the port 186b is allowed to communicate with port 186c.

The throttle valve 114 (clutch pressure regulator valve) has a valve bore 192, formed in the valve body, that is provided with ports 192a, 192b, 192c, 192d, 192e, 192f, and 192g, a spool 194 having five lands 194a, 194b, 194c, 194d, and 194e, and a vacuum diaphragm 198 that biases the spool 194. When the engine intake manifold vacuum is lower than a predetermined value, for example, 300 mmHg, (viz., when the engine intake manifold vacuum is near the atmospheric level), the vacuum diaphragm 198 biases the spool 194 with a force that is in inverse proportion to the magnitude of the vacuum, whereas when the intake manifold vacuum is higher than the predetermined value, it applies no force to the spool 194. The port 192a is a drain port, the ports 192b and 192d communicate with the hydraulic fluid line 140 serving as the throttle pressure circuit, the port 192c communicates with the hydraulic fluid line 132 serving as the line pressure circuit, the port 192e is a drain port, and the port 192g communicates with the before mentioned hydraulic fluid line 189. The inlets to the ports 192b and 192g are provided with orifices 202 and 203, respectively. The spool 194 is subject to two forces directed to the left as viewed in FIGS. 2A and 2B, one resulting from the hydraulic fluid pressure supplied to port 192g to act on a differential area between the lands 194d and 194e and the other by the vacuum diaphragm 198, and it is also subject to a force, directed to the right as viewed in FIGS. 2A and 2B resulting from the hydraulic fluid pressure supplied to port 192b to act on a differential area between the lands 194a and 194b. The throttle valve 114 effects a pressure regulation until the above mentioned forces balance with each other by using the line pressure supplied to the port 192c as a pressure source and the port 192e as a discharge port. The characteristic of the throttle pressure developed at the ports 192b and 192d is such that it increases as the engine intake manifold vacuum decreases. The magnitude of the throttle pressure is adjustable by varying the adjustment pressure supplied to the port 192g.

The constant pressure regulator valve 116 has a valve bore 204, formed in the valve body, that is provided with ports 204a, 204b, 204c, 204d, and 204e, a spool 206 having lands 206a and 206b, and a spring 208 biasing the spool 206 to the left as viewed in FIGS. 2A and 2B. The ports 204a and 204c communicate with a hydraulic fluid line 209. The port 204b communicates with the hydraulic fluid line 132 serving as the line pressure circuit. The ports 204d and 204e are drain ports. The inlet to the port 204a is provided with an orifice 216. The constant pressure regulator valve 116 effects a pressure regulation to provide a constant hydraulic fluid pressure corresponding to the force of spring 208 in hydraulic fluid line 209. The hydraulic fluid line 209 is connected via a choke type throttle valve 250 with the hydraulic fluid line 188 and it is connected via a choke type throttle valve 252 with the hydraulic fluid line 189. The hydraulic fluid line 209 is provided with a filter 211.

The solenoid operated valve 118 is so constructed as to adjust the discharge, in amount, of hydraulic fluid from the drain conduit 190 to a drain port 222. The adjustment is made by a plunger 224a biased by a spring 225 toward a closed postiion where the discharge is prohibited under the control of a solenoid coil 224. Solenoid coil 224 is subject to pulse duty factor control by control unit 300. Since the amount of hydraulic fluid discharged is in inverse proportion to the amount of current passing through the solenoid 224, the hydraulic fluid pressure (adjustment pressure) is variable in inverse proportion to the amount of current passing through the solenoid 224.

The coupling pressure regulator valve 120 has a valve bore 230, formed in the valve body, that is provided with ports 230a, 230b, 230c, 230d and 230e, a spool 232 having lands 232a and 232b, and a spring 234 biasing the spool 232 to the left as viewed in FIGS. 1A and 1B. The ports 230a and 230c communicate with a hydraulic fluid line 235, the port 230b is supplied via the hydraulic fluid line 165 with hydraulic fluid which is discharged by the line pressure regulator valve 102, and the ports 230d and 230e are drain ports. The inlet to the port 230a is provided with an orifice 236. The coupling pressure regulator valve 120 effects pressure regulation using hydraulic fluid pressure applied to port 230b as a source of hydraulic pressure and provides a constant hydraulic fluid pressure (coupling pressure) corresponding to the force of spring 234. This hydraulic fluid pressure is supplied to the hydraulic fluid line 235. This coupling pressure is used as a working pressure within the fluid coupling 12, and it is also used to actuate the lock-up mechanism.

The lock-up control valve 122 comprises a valve bore 240, formed in the valve body, that is provided with ports 240a, 240b, 240c, 240d, 240e, 240f, 240g, and 240h, and a spool 242 having lands 242a, 242b, 242c, 242d, and 242e. The ports 240a and 240g are drain ports, port 240b communicates with the hydraulic fluid line 209, the ports 240c and 240f communicate via the hydraulic fluid line 243 with the lock-up chamber 12a, the port 240d is connected with the hydraulic fluid line 245 that communicates with the fluid coupling 12. The port 240e is supplied with the constant coupling pressure from the hydraulic fluid line 235. The port 240h is connected with the before mentioned hydraulic fluid line 188. The inlets to the ports 240b, 240c, 240g, and 240h are provided with orifices 246, 247, 248, and 249, respectively. This lock-up control valve 122 controls the supply of hydraulic fluid pressure to the fluid coupling 12 and that to the lock-up chamber 12a. The spool 242 shifts from one position to another position when the following three forces attain a predetermined relationship, one due to hydraulic fluid pressure (i.e., constant fluid pressure obtained after pressure regulation by constant pressure regulator valve 116) supplied to the port 240b to act on a differential area between the lands 242a and 242b, another due to hydraulic fluid pressure supplied to the port 240c to act on a differential area between the lands 242b and 242c, and the other due to hydraulic fluid pressure supplied to the port 240h to act on axial end of the land 242e. When the spool 242 assumes a lock-up position indicated by the upper half thereof, the port 240f is allowed to communicate with the port 240g via a space defined in the valve bore between the lands 242d and 242e, thus allowing the lock-up chamber 12a to be drained via the port 240g. In this lock-up position, the port 240d is allowed to communicate with the port 240e via a space defined in the valve bore between the lands 242c and 242d, thus allowing the supply of the coupling pressure generated by the coupling pressure regulator valve 120 to the inside of the fluid coupling 12 via the fluid line 245. As a result, the lock-up mechanism assumes the lock-up state.

The hydraulic fluid line 245 is provided with a relief valve 250 that prevents application of abnormally high pressure to the fluid coupling 12. When, on the other hand, the spool 242 assumes a release position indicated by the lower half thereof as illustrated in FIGS. 2A and 2B, the port 240e is allowed to communicate with the port 240f via a space defined within the valve bore between the lands 242d and 242e, thus allowing the supply of the coupling pressure to the lock-up chamber 12a via the hydraulic fluid line 243. The port 240d, in this position, is sealed by the lands 242c and 242d. As a result, the lock-up mechanism assumes the release state, thus providing a state wherein the hydraulic fluid is supplied, as working fluid pressure, to the inside of the fluid coupling 12 via the lock-up chamber 12a past the clearance 12f (see FIG. 1). The hydraulic fluid pressure within the fluid coupling 12 is kept at a constant value by means of a pressure maintaining valve 252. The hydraulic fluid discharged by the pressure maintaining valve 252 is supplied via a hydraulic fluid line 254 to a cooler 256 where it is cooled before used for lubrication. The hydraulic fluid line 254 is provided with a cooler pressure maintaining valve 258. The hydraulic fluid discharged by the cooler pressure maintaining valve 258 returns via a hydraulic fluid line 164 to intake port of the hydraulic fluid pump 101. The hydraulic fluid line 254 leads to an area where the bias member 158 is slidably engaged with the valve body to lubricate there. The hydraulic fluid line 254 is connected via an orifice 259 with the hydraulic fluid line 235.

Hereinafter, the control unit 300 is described.

Figure 3:
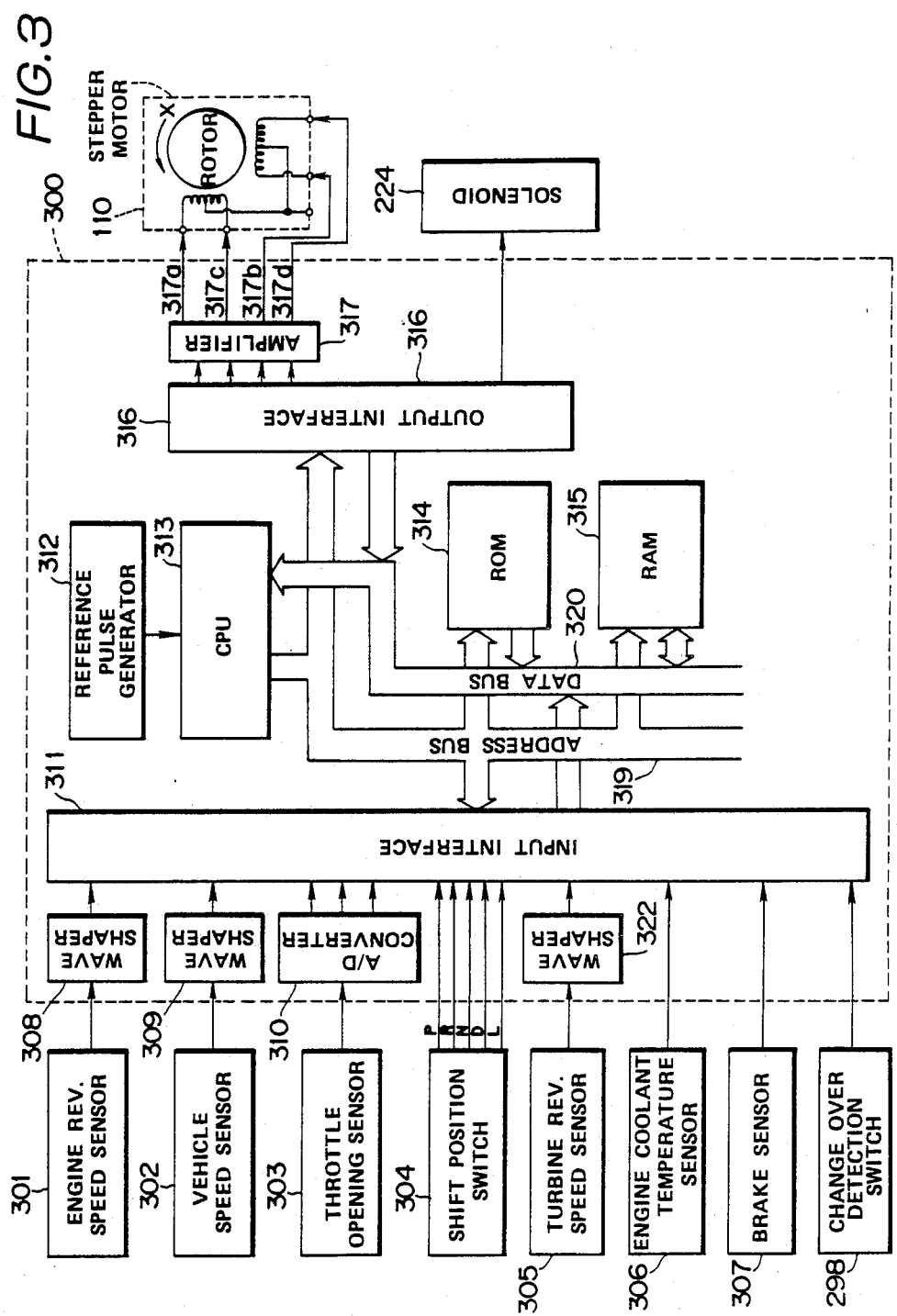
FIG. 3 is a detailed block diagram of a control unit for a stepper motor 110 and a solenoid 224 shown in FIGS. 2A and 2B.

As shown in FIG. 3, the control unit 300 is supplied with electric signals from an engine revolution speed sensor 301, a vehicle speed sensor 302, a throttle opening degree sensor 303, a shift position switch 304, a turbine revolution speed sensor 305, a change-over detection switch 298, an engine coolant temperature sensor 306, and a brake sensor 307. The engine revolution speed sensor 301 detects engine revolution speed by counting the number of engine ignition spark pulses, and the vehicle speed sensor 302 detects vehicle speed by measuring rotation of the output shaft of the continuously variable transmission. The throttle opening sensor 303 detects engine throttle opening degree in terms of an electric voltage. The shift position switch 304 detects which of positions P, R, N, D, and L the before mentioned manual valve 104 assumes. The turbine revolution speed sensor 305 detects the revolution speed of the turbine shaft of the fluid coupling 12. The change-over detection switch 298 is turned ON when the rod 182 of the shift operation mechanism 112 moves further beyond the maximum reduction ratio corresponding position (i.e., when the rod 182 is disposed in the overstroke range).

The engine coolant temperature sensor 306 generates an output signal when engine coolant temperature is lower than a predetermined value. The brake sensor 307 detects whether the vehicle brake is applied or not. Output signals from engine revolution speed sensor 301, vehicle speed sensor 302, and turbine revolution speed sensor 305 are supplied via associated wave shapers 308 and 309 to an input interface 311. Electric voltage signal from the throttle opening sensor 303 is converted into a digital signal at an AD converter 310 before supplied to the input interface 311. The control unit 300 comprises input interface 311, a CPU (central processor unit) 313, a reference pulse generator 312, a ROM (random access memory) 315, and an output interface 316. These elements are interconnected by an address bus 319 and a data bus 320. Reference pulse generator 312 generates reference pulse on which CPU 313 operates. RAM 315 temporarily stores information from various sensors and switch and parameters necessary for control. Output signals of the control unit 300 is supplied via output interface 316 and an amplifier 317 to the stepper motor 110 and via input interface 316 to the solenoid 224.

Referring back to FIG. 1, there are shown in block diagram the engine revolution speed sensor 301, the vehicle speed sensor 302, the throttle opening degree sensor 303, the control unit 300, the amplifier 317 and the hydraulic control system enclosed by phantom line drawn block with the stepper motor 110. As shown in FIG. 1, the hydraulic control system includes the hydraulic fluid lines 176 and 179 communicating with the driver pulley chamber 20 and the follower pulley chamber 32, respectively. This block diagram is a simplification of the constructions shown in FIGS. 2A, 2B and 3 by removing components unnecessary for the following description.

Figure 4:
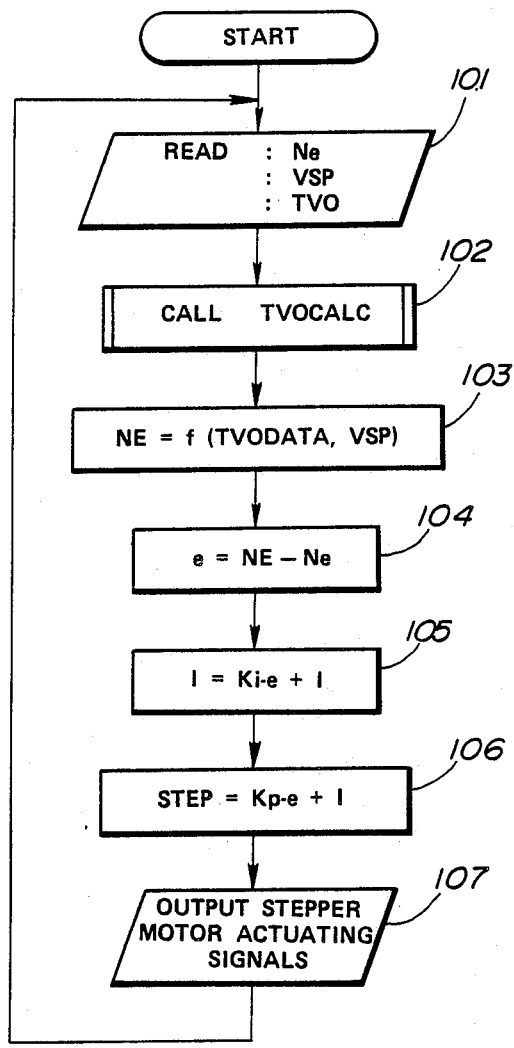
FIG. 4 is a flow chart of a main routine stored in a ROM 314 shown in FIG. 3.
Figure 5:
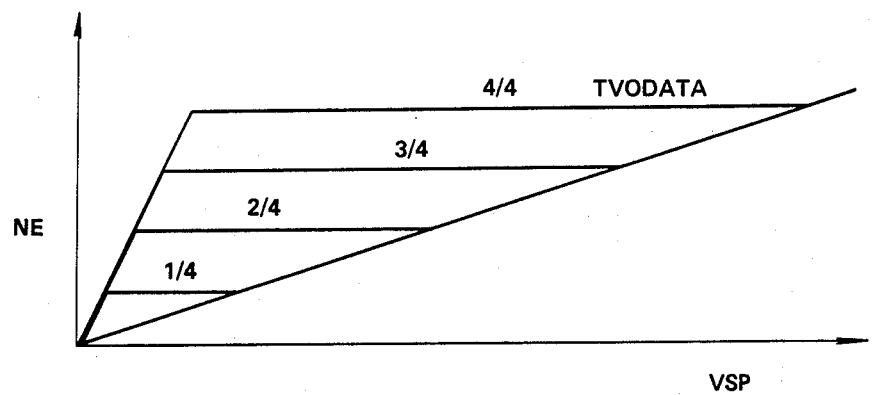
FIG. 5 is a graph illustrating a map stored in the ROM 314, which map is used for determining a target engine revolution speed NE in the main routine.

Referring to FIG. 4, a general flow of a main routine for controlling a reduction ratio is described. At a step 101, the CPU 313 (see FIG. 3) reads sensor outputs of the sensors 301, 302 and 303 via the input interface 311 and stores data as an engine revolution speed Ne, a vehicle speed VSP and a throttle opening degree TVO. At a step 102, the CPU 313 starts to execute a sub-routine program TVOCALC which will be described later in connection with FIG. 6. In the sub-routine TVOCALC, a throttle opening degree data value TVODATA is determined. After executing the sub-routine TVOCALC, the CPU 313 performs, at a step 103, a table look-up operation of a map as illustrated in FIG. 5 using the throttle opening degree data value TVODATA and the vehicle speed VSP to determine a target engine revolution speed NE. At a step 104, the CPU 313 determines an error e after calculating an equation $e = NE - Ne$. At a step 105, the CPU 313 performs an increment operation of an integral term I of a PI control by a value $Ki \times e$ (Ki: an integral gain). At a step 106, the CPU 313 executes an instruction to add the integral term I to a proportional term $Kp \times e$ (Kp: a proportional gain) to give a result as a STEP. At a step 107, the CPU 313 determines stepper motor actuating signals in response to the value STEP and outputs the stepper motor actuating signals via the output interface 316. The stepper motor 110 is rotated in response to the stepper motor actuating signals. For better understanding of the stepper motor actuating signals, reference should be made to U.S. Pat. No. 4,597,308 issued to Tanaka et al on July 1, 1986 which has been hereby incorporated by reference. Referring to FIGS. 2A and 2B, rotation of the stepper motor 110 causes the shift operation mechanism 112 to move the spool 174 of the shift control valve 106 which regulates the fluid supply to and fluid discharge from the driver pulley chamber 20. Thus, the speed ratio between the driver and follower pulleys 16 and 26 varies to cause a change in the engine revolution speed in a direction toward the target engine revolution speed NE.

Referring to FIGS. 6, 7A, 7B, 7C and 7D, the sub-routine TVOCALC is now described.

Figure 6:
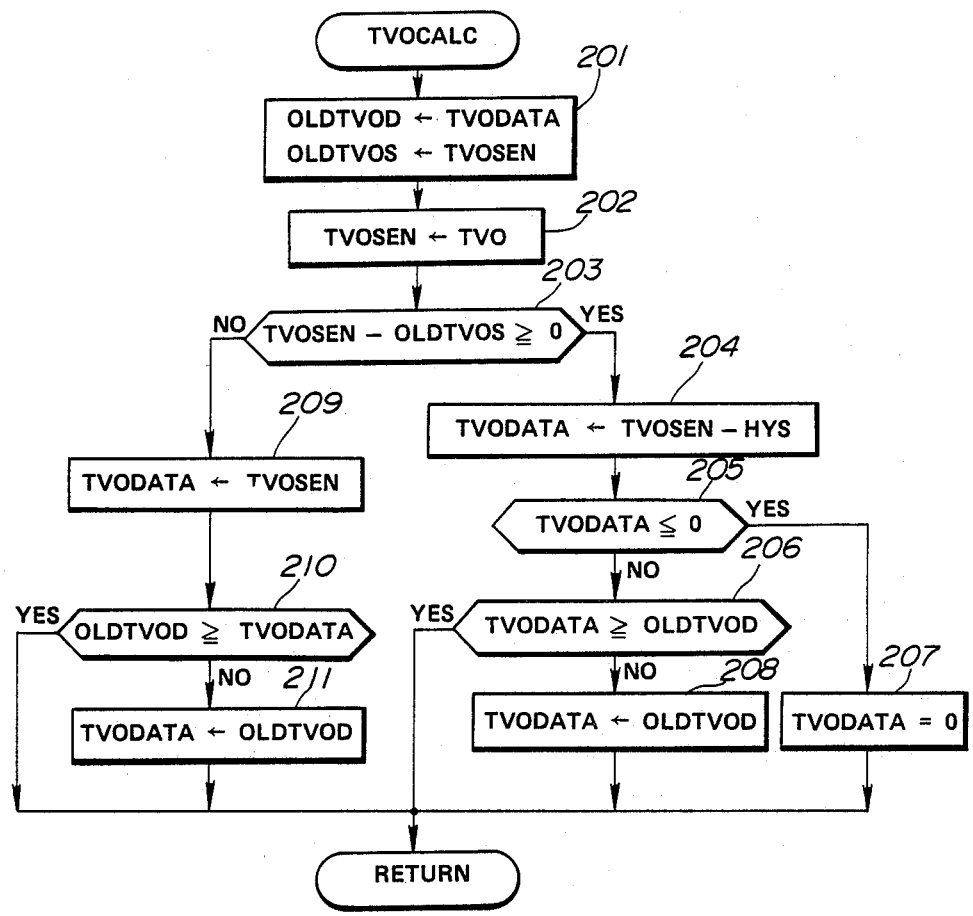
FIG. 6 is a flow chart of a sub-routine TVOCALC.
Figure 7A:
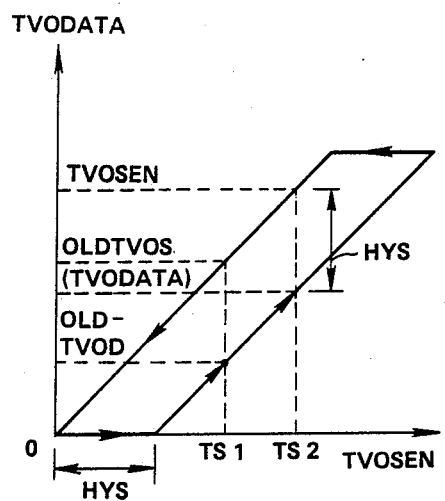
FIGS. 7A-7D are graphical representations used to explain the sub-routine TVOCALC shown in FIG. 6.

(a) In the case where the throttle opening degree sensor value TVOSEN is increasing:

Referring particularly to FIGS. 6 and 7A, let us assume that the sensor value TVOSEN is increasing and the previous run of the sub-routine TVOCALC occurred at the instant when the throttle opening degree sensor value was TS1, and the sub-routine TVOCALC is executed at the present instant when the throttle opening degree sensor value is TS2. This is the case which occurs when the accelerator pedal is manipulated in the depressed direction only.

The flow of jobs at the present instant when the throttle opening degree senor value is TS2 is described. After reading operation at the step 101 (see FIG. 4), the content of TVO becomes TS2. At a step 201, the CPU 313 executes instructions to copy data of TVODATA and TVOSEN which were set during the previous run to OLDTVOD and OLDTVOS, respectively. Thus, the contents of OLDTVOD and OLDTVOS indicate an old throttle opening degree data and an old throttle opening degree sensor value, respectively. At a step 202, the CPU 313 executes an instruction to copy content (viz., TS2) of TVO to TVOSEN. Thus, the content of TVOSEN now indicates the present throttle opening degree value TS2. At a comparison step 203, the content of TVOSEN is compared with the content of OLDTVOS by subtracting the content of OLDTVOS from the content of TVOSEN and judging whether the result of this calculation is greater than or equal to 0 or not. Since in this case TS2 is greater than TS1, the answer of this comparison step 203 is YES so that the program goes to a step 204 where the content of the throttle opening degree data TVODATA is set. At the step 204, a predetermined hysteresis width HYS is subtracted from the content of TVOSEN and the result is placed at TVODATA. At a step 205, the CPU 313 performs an instruction to judge wether the content of TVODATA is less than or equal to 0 or not. Since, in this case, the content of TVODATA is greater than 0 as will be readily understood from FIG. 7A, the program goes to a step 206. At the step 206, the CPU 313 executes an instruction to judge whether the content of TVODATA is greater than or equal to the content of OLDTVOD or not. As can be seen in FIG. 7A, the content of TVODATA is greater than the content of OLDTVOD so that the program goes from the step 206 to the step 103 of the main routine 103 where using the content of TVODATA (=TVOSEN−HYS) and the vehicle speed VSP, a table look-up operation of the data map shown in FIG. 5 is performed to give the target engine revolution speed NE.

Figure 7B:
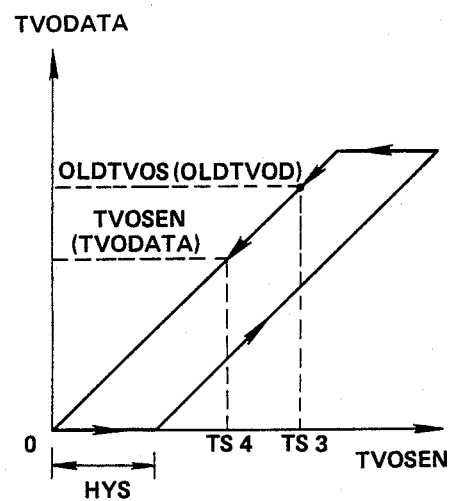

(b) In the case where the throttle opening degree sensor value TVOSEN is decreasing:

Referring particularly to FIGS. 6 and 7B, let us assume that the sensor value TVOSEN is decreasing and the previous run of the sub-routine TVOCALC occurred at the instant when the throttle opening degree sensor value was TS3, and the sub-routine TVOCALC is executed at the present instant when the throttle opening degree sensor value is TS4. This is the case which occurs when the accelerator pedal is manipulated in the released direction only.

The flow of jobs at the present instant when the throttle opening degree sensor value is TS4 is described. The jobs from the step 201 to the step 203 are the same as the previously described case. In this case, since the content of TVOSEN (viz., TS4) is less than the content of OLDTVOS (viz., TS3), the program goes to a step 209 after the step 203. At the step 209, the CPU 313 executes an instruction to copy the content of TVOSEN to TVODATA. Then, at a step 210, the CPU 313 executes an instructuion to judge whether the content of TVODATA is less than or equal to the content of OLDTVOD or not. Since the content of TVODATA is less than the content of OLDTVOD as can be seen in FIG. 7B, the program goes to the step 103 of the main routine (see FIG. 4) after this step 210.

Figure 7C:
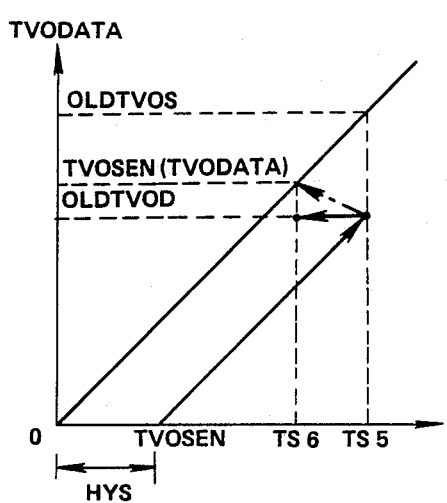

(c) In the case where a present change in the throttle opening degree sensor value TVOSEN is in the decreasing direction and the prior change was in the increasing direction and besides the magnitude of the present change is less than the hysteresis width HYS:

Referring particularly to FIGS. 6 and 7C, let us assume that the sensor value TVOSEN was increasing when the previous run of sub-routine TVOCALC occurred at the instant when the throttle opening degree sensor value was TS5, and the sensor value TVOSEN is decreasing when the sub-routine TVOCALC is executed at the present instant when the throttle opening degree sensor value is TS6. This is the case which occurs when the accelerator pedal is released after being depressed. The magnitude of this change from TS5 to TS6 is less than the hysteresis width HYS.

The flow of jobs at the present instant when the throttle opening degree sensor value is TS6 is described. The jobs from the step 201 to the step 203 are the same as the previously described cases. In this case, since the content of TVOSEN (viz., TS6) is less than the content of OLDTVOS (viz., TS5), the program goes to the step 209 after the step 203. After the execution of the step 210, the program goes to a step 211 since the content of OLDTVOD is less than the content of TVODATA as can be seen in FIG. 7C. At the step 211, the CPU 313 executes an instruction to copy the content of OLDTVOD to TVODATA. Thus, at this step 211, the content of TVODATA is overwritten and becomes equal to the content of OLDTVOD. Thus, in this case discussed above, the content of the throttle opening degree data TVODATA stays unchanged.

Figure 7D:
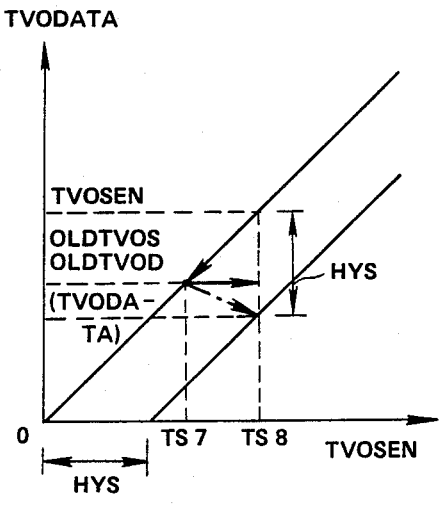

(d) In the case where a change in the throttle opening degree sensor value TVOSEN is in the increasing direction and the prior change was in the decreasing direction and besides the magnitude of this change is less than the hysteresis width HYS:

Referring to FIG. 7D also, let us assume that the sensor value TVOSEN was decreasing when the previous run of sub-routine TVOCALC occurred at the instant when the throttle opening degree sensor value was TS7, and the sensor value TVOSEN is decreasing when the sub-routine TVOCALC is executed at the present instant when the throttle opening degree sensor value is TS8. This is the case which occurs when the accelerator pedal is depressed after being released. The magnitude of this change from TS7 to TS8 is less than the hysteresis width HYS.

The flow of jobs at the present instant when the throttle opening degree sensor value is TS6 is described. The jobs from the step 201 to the step 203 are the same as the previously described cases. In this case, since the content of TVOSEN (viz., TS8) is greater than the content of OLDTVOS (viz., TS7), the program goes to the step 204 after the step 203. At the step 204, the hysteresis width HYS is substracted from the content of TVOSEN (viz., TS8) and the result is placed at TVODATA. Since the content of TVODATA is greater than 0, the program goes to the step 206 after ths step 205. After executing the step 206, the program goes to a step 208 since the content of TVODATA is less than the content of OLDTVOD as can be seen in FIG. 7D. At the step 208, the CPU 313 executes an instruction to copy the content of OLDTVOD to TVODATA. Thus, in this case, the content of TVODATA stays unchanged. If at the step 205, the content of TVODATA is less than 0, the content of TVODATA is set equal to 0 at a step 207.

Referring to FIGS. 8, 9A, 9B, 9C and 9D, alternative embodiment of a sub-routine TVOCALC is described.

Figure 8:
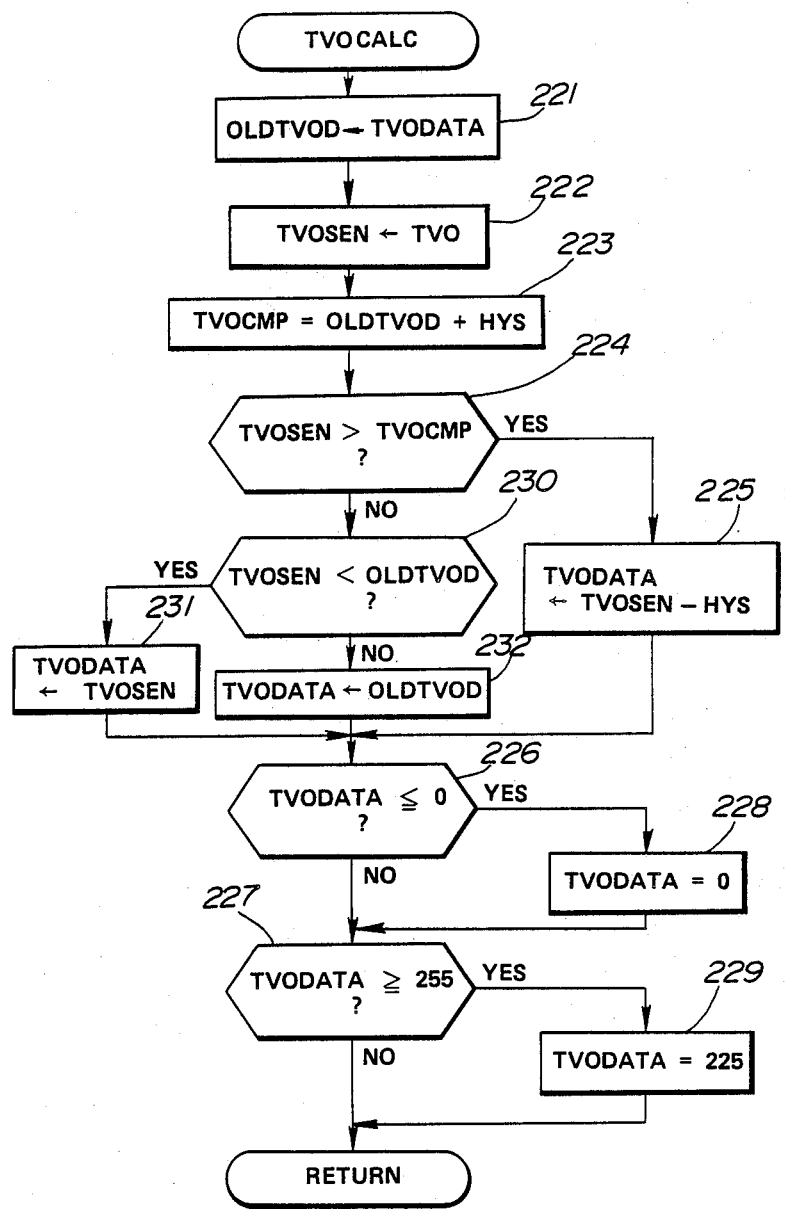
FIG. 8 is an alternative embodiment of a sub-routine TVOCALC.
Figure 9A:
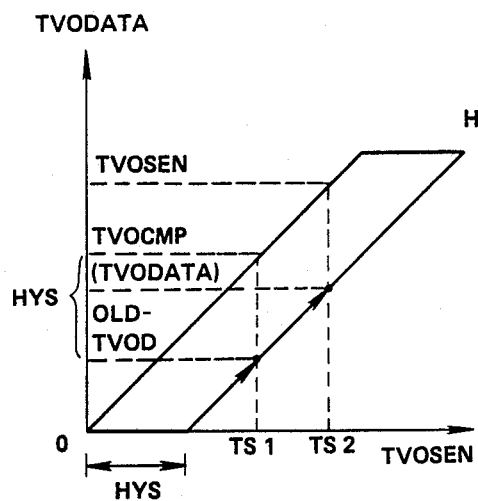
FIGS. 9A-9D are graphical representations used to explain the sub-routine TVOCALC shown in FIG. 8.

(a) In the case where the throttle opening degree sensor value TVOSEN is increasing:

Referring particularly to FIGS. 8 and 9A, let us assume that the sensor value TVOSEN is increasing and the previous run of the sub-routine TVOCALC occurred at the instant when the throttle opening degree sensor value was TS1, and the sub-routine TVOCALC is executed at the present instant when the throttle opening degree sensor value is TS2. This is the case which occurs when the accelerator pedal is manipulated in the depressed direction only.

The flow of jobs at the present instant when the throttle opening degree sensor value is TS2 is described. After reading operation at the step 101 (see FIG. 4), the content of TVO becomes TS2. At a step 221, the CPU 313 executes an instruction to copy the content of TVODATA which was set during the previous run to OLDTVOD. Thus, the content of OLDTVOD indicates an old throttle opening degree data. At a step 222, the CPU 313 executes an instruction to copy the content (viz., TS2) of TVO to TVOSEN. Thus, the content of TVOSEN now indicates the present throttle opening degree value TS2. At a step 223, the CPU 313 executes an instruction to add a hysteresis width HYS to the content of OLDTVOD and write the result in a comparison value TVOCMP. At a step 224, the CPU 313 performs an operation to compare the content of TVOSEN (viz., TS2) with TVOCMP (viz., TS1). Since, in this case the content of TVOSEN is greater than TVOCMP, the program goes to a step 225. At the step 225, the CPU 313 executes an instruction to subtract the hysteresis width HYS from the content of TVOSEN and write the result in TVODATA. Then, at a step 225, the CPU 313 executes an instruction to judge whether the content of TVODATA is less than or equal to 0 or not. Since the content of TVODATA is not 0 in this case, the program goes to a step 227. If the content of TVODATA is less than 0, the program goes to a step 228 where the CPU 313 set the content of TVODATA as 0. At the step 227, the CPU 313 executes an instruction to judge whether the content of TVODATA is greater than or equal to 255 or not. If the content of TVODATA is less than 255, this content is used at the step 103 of the main routine shown in FIG. 4. If the content of TVODATA is greater than or equal to 255, the content of the TVODATA is set as 255, and the value 255 is used at the step 103 of the main routine. These steps 227 and 229 are provided to prevent overflow of the data when the CPU 313 performs the table look-up operation at the step 103 since in this embodiment a 8-bit microcomputer is used.

Figure 9B:
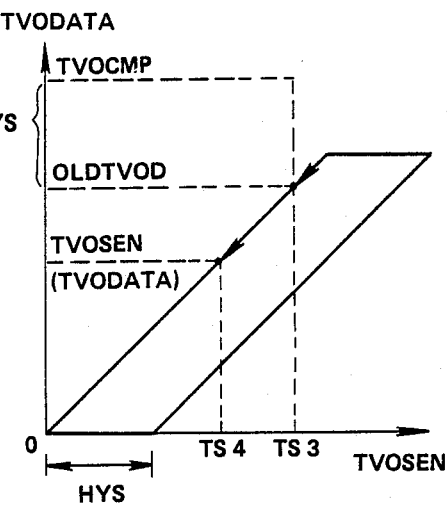

(b) In the case where the throttle opening degree sensor value TVOSEN is decreasing:

Referring to FIGS. 8 and 9B, let us assume that the sensor value TVOSEN is decreasing and the previous run of the sub-routine TVOCALC occurred at the instant when the throttle opening degree sensor value was TS3, and the sub-routine TVOCALC is executed at the present instant when the throttle opening degree sensor value is TS4. This is the case which occurs when the accelerator pedal is manipulated in the released direction only.

The flow of jobs at the present instant when the throttle opening degree sensor value is TS4 is described. The jobs from the step 221 to the step 224 are the same as the previously described case. Since in this case the content of TVOSEN is less than the content of TVOCMP, the program goes to a step 230 after the step 224. At the step 230, the CPU 313 executes an instruction to judge whether the content of TVOSEN is less than the content of OLDTVOD or not. Since the content of TVOSEN is less than the content of OLDTVOD, the program goes to a step 231. At the step 231, the CPU 313 executes an instruction to copy the content of TVOSEN to TVODATA. The jobs from step 226 and onwards are the same as the previous case. Now it will be understood that the content of TVOSEN is used as the content of TVODATA in this case.

Figure 9C:
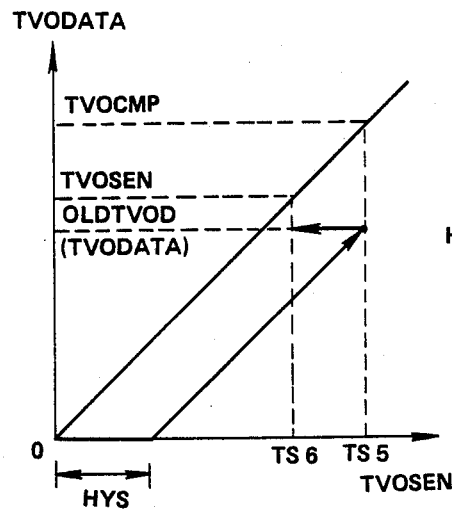

(c) In the case where a present change in the throttle opening degree sensor value TVOSEN is in the decreasing direction and the prior change was in the increasing direction and besides the magnitude of the present change is less than the hysteresis width HYS:

Referring to FIGS. 8 and 9C, let us assume that the sensor value TVOSEN was increasing when the previous run of the sub-routine TVOCALC occurred at the instant when the throttle opening degree sensor value was TS5, and the sensor value TVOSEN is decreasing when the sub-routine TVOCALC is executed at the present instant when the throttle opening degree sensor value is TS6. This is the case which occurs when the accelerator pedal is released after being depressed. The magnitude of this change from TS5 to TS6 is less than the hysteresis width HYS.

The flow of jobs at the present instant when the throttle opening degree sensor value is TS6 is described. The jobs from the step 221 to the step 224 are the same as the previously described cases. In this case, since the content of TVOSEN (viz., TS6) is less than the content of TVOCMP (viz., TS5), the program goes to the step 230 after the step 224. After the step 230, the program goes to a step 232 since the content of TVOSEN is greater than the content of OLDTVOD. At the step 232, the CPU 313 executes an instruction to copy the content of OLDTVOD to TVODATA. The jobs of the step 226 and onwards are the same as the previous case. It will now be understood that the content of TVODATA stays unchanged in this case.

Figure 9D:
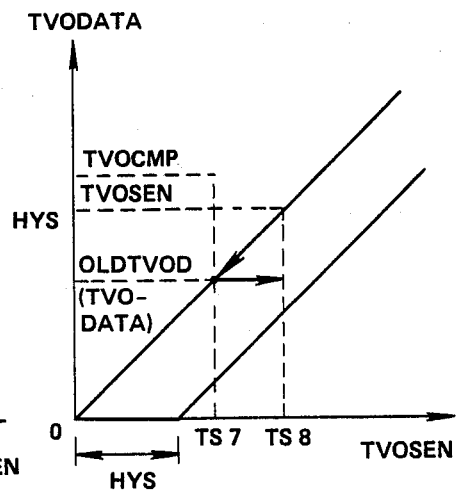

(d) In the case where a present change in the throttle opening degree sensor value TVOSEN is in the increasing direction and the prior change was in the decreasing direction and besides the magnitude of the present change is less than the hysteresis width HYS:

Referring to FIGS. 8 and 9D, let us assume that the sensor value TVOSEN was decreasing when the previous run of sub-routine TVOCALC occurred at the instant when the throttle opening degree sensor value was TS7, and the sensor value TVOSEN is decreasing when the sub-routine TVOCALC is executed at the present instant when the throttle opening degree sensor value is TS8. This is the case which occurs when the accelerator pedal is depressed after being released. The magnitude of this change from TS7 to TS8 is less than the hysteresis width HYS.

The flow of jobs at the present instant when the throttle opening degree sensor value is TS6 is described: The jobs from the step 221 to the step 224 are the same as the previously described cases. In this case, since the content of TVOSEN (viz., TS8) is less than the content of TVOCMP, the program goes to the step 230 after the step 224. After the step 230, the program goes to the step 232 since the content of TVOSEN is greater than the content of OLDTVOD. At the step 232, the CPU 313 executes an instruction to copy the content of OLDTVOD to TVODATA. The jobs at the step 225 and onwards are the same as the previous cases. It will now be understood that the content of TVODATA stays unchanged in this case.

Figure 10:
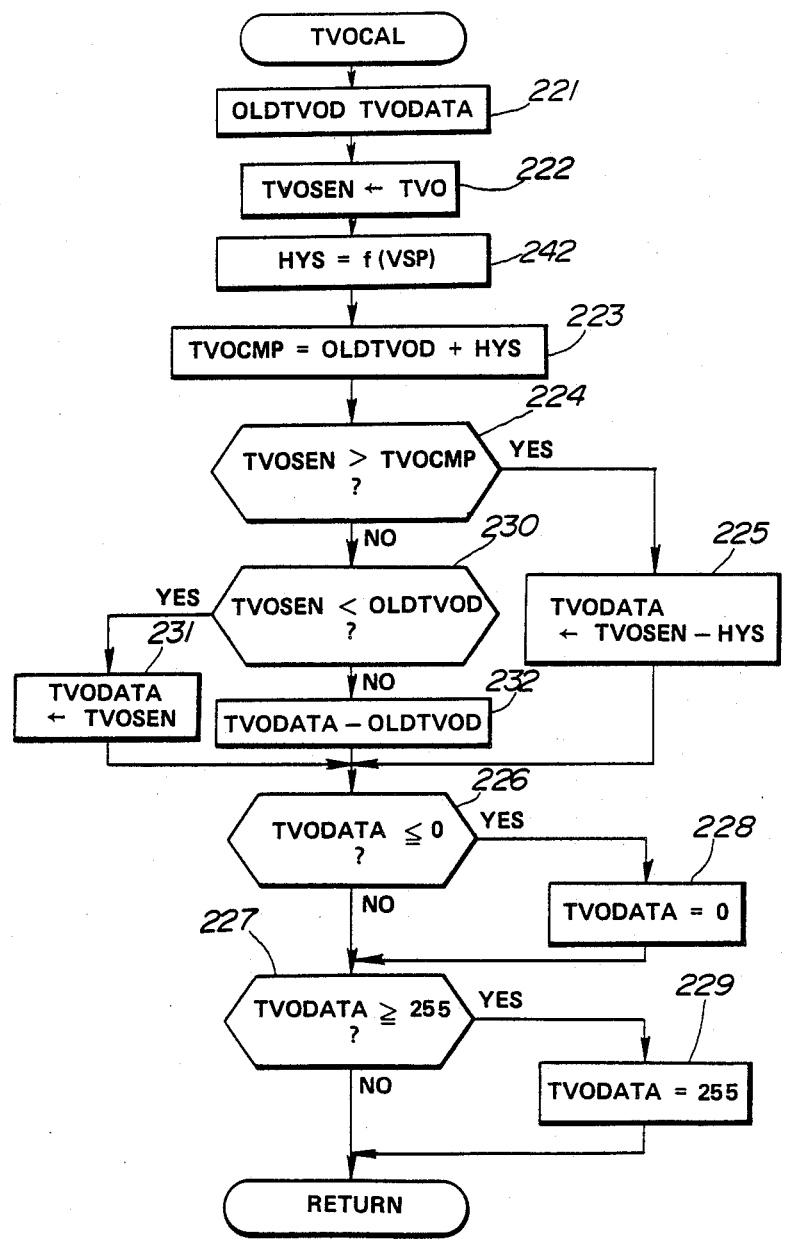
FIG. 10 is a modified embodiment of a sub-routine TVOCALC.
Figure 11:
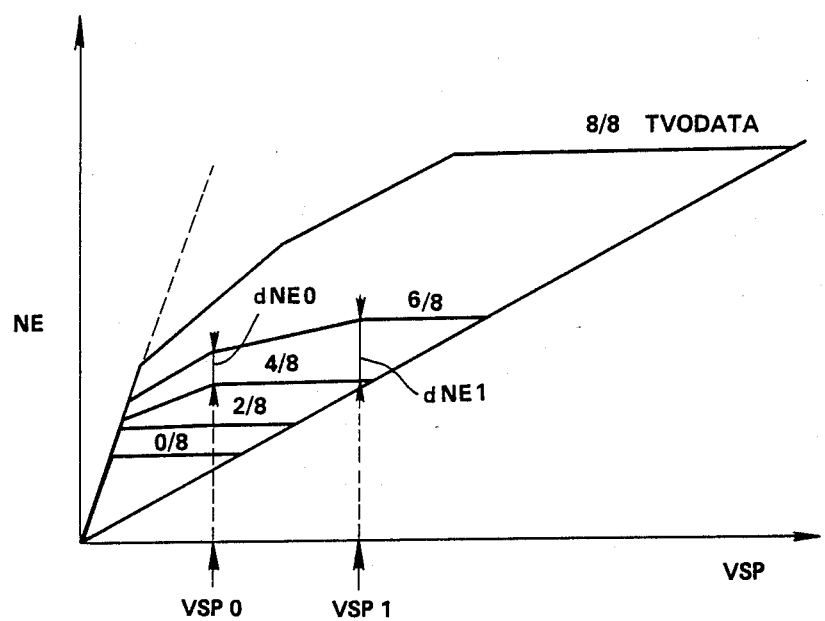
FIG. 11 is a graph illustrating an alternative map stored in the ROM 314 and used in the modified embodiment.

Referring to FIGS. 10, 11, 12, and 13, a modified embodiment is described. In this embodiment, a table look-up operation is performed in a step 104 of a main routine using a map as shown in FIG. 11 which is stored in a ROM 314 instead of the previously mentioned map shown in FIG. 5. As shown in FIG. 11, the map represents a target engine revolution speed (NE) versus vehicle speed (VSP) characteristic for different throttle opening degrees. Assuming now that the throttle opening degree changes from 4/8 to 6/8, this change causes different changes in target engine revolution speed at different vehicle speeds. The change dNE1 at a relatively high vehicle speed VSP1 is greater than the change dNE0 at a relatively low vehicle speed VSP0. Thus, there is the trend that with the same change in throttle opening degree, the change in target engine revolution speed increases as the vehicle speed increases.

Figure 12:
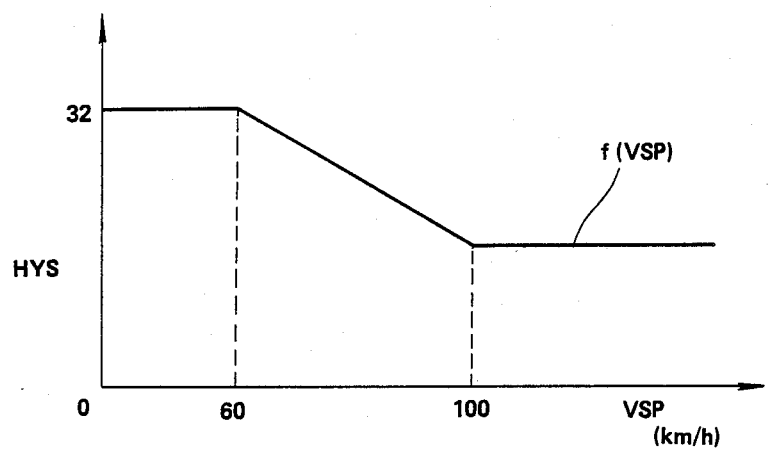
FIG. 12 is a graph illustrating how a hysteresis HYS varies with variations of a vehicle speed VSP.

If in this case the same hysteresis width HYS is used regardless of the vehicle speed VSP, with the same change in throttle opening degree, there occurs a relatively great variation in engine revolution speed at a relatively high vehicle speed. Thus, in this embodiment, the hysteresis width HYS is variable with the vehicle speed VSP in a pattern as shown in FIG. 12.

Figure 13:
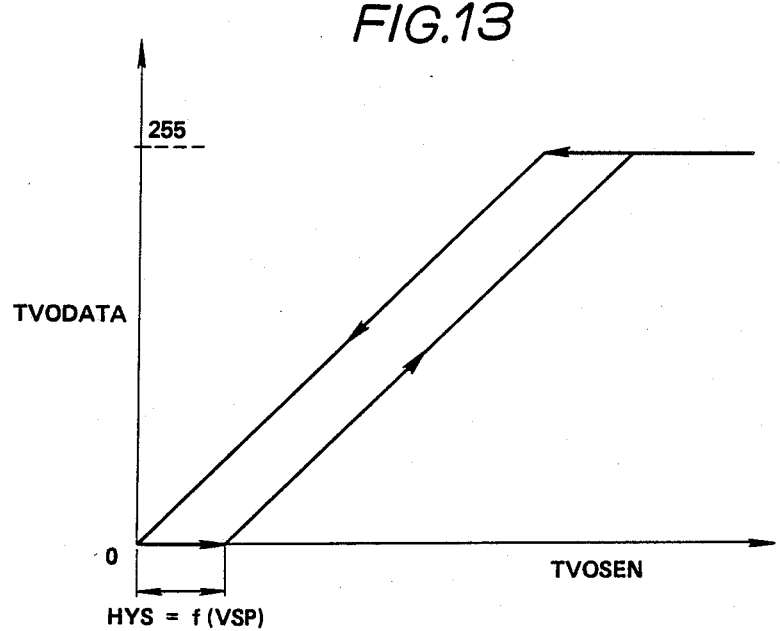
FIG. 13 is a graphical representation of a hysteresis loop effected by this modified embodiment.
Figure 14:
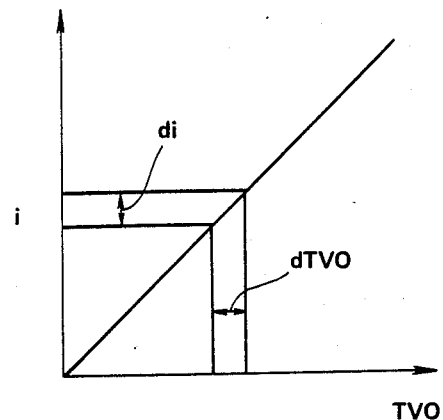
FIGS. 14 shows a linear characteristic of the prior art ratio control system.
Figure 15:
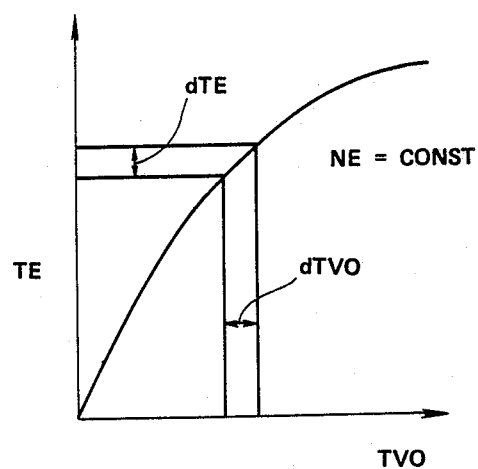
FIG. 15 shows an engine performance curve with a constant engine speed.

Referring to FIG. 10 in comparison With FIG. 8, it will be readily noted that the sub-routine shown in FIG. 10 is substantially the same as that shown in FIG. 8 except the provision of a step 242 between steps 221 and 223. At this step 242, the CPU 313 (see FIG. 3) performs a table look-up operation of the map shown in FIG. 12 using the vehicle speed VSP stored at a step 101 of the main routine shown in FIG. 4. FIG. 13 illustrates a hysteresis loop provided after execution of the sub-routine TVOCAL shown in FIG. 10.

From the previous description of various embodiments, it will now be appreciated that according to the present invention, the reduction ratio control response characteristic (viz., a throttle opening degree TVO versus reduction ratio i characteristic) as expected on a continuously variable transmission is secured while the throttle opening degree continues to increase or decrease since a liner characteristic is provided.

According to the present invention, a reduction ratio i can stay unchanged even if the direction of a present change in throttle opening degree is different from the direction of the prior change as long as the magnitude of this present change is less than the hysteresis width HYS. This causes a less change in transmission output torque as compared to the prior art discussed in the introductory part of this specification because the change in the transmission output shaft torque results from a change in engine torque dTE only which is caused by the change in throttle opening degree dTVO, whereas in the prior art this change results from dTE×di. Thus, the control according to the present invention assures a smooth operation when a vehicle driver manipulates an accelerator pedal to vary the engine throttle within the hysteresis width (HYS) in order to maintain a crusing speed, providing improved riding comfort.

In the previously described embodiments, in order to provide a desired variation characteristic of reduction ratio i against throttle opening degree TVO, the throttle opening degree data value TVODATA which is a variable in determining a target engine revolution speed NE is set after conversion employing a hysteresis width. Thus, any substantial change in the main routine for controlling a reduction ratio is not required. What is only required is to add one of the sub-routines TVO-CALC to the main routine. Therefore, a change in i-TVO characteristic is very easy.

In the case of the third embodiment described in connection with FIGS. 10–13, since the hystresis width HYS is variable with vehicle speed VSP, the target engine revolution speed variation characteristic as illustrated in FIG. 11 can be employed. Thus, the engine revolution speed characteristic can be easily varied.

In the previously described embodiments the hysteresis is provided between the throttle opening degree data TVODATA and the throttle opening degree sensor value TVOSEN. Alternatively, there may be provided a hysteresis between the target engine revolution speed NE and the throttle valve opening sensor value TVOSEN, while the throttle valve opening degree sensor value is used as TVODATA.

What is claimed is:

1. A ratio control system of a continuously variable transmission for an automotive vehicle having an engine drivingly coupled with the continuously variable transmission and an accelerator pedal manually operable to vary a power demand on the engine, comprising:
   a sensor means for sensing the power demand on the engine and generating a power demand indicative sensor output signal;
   control means responsive at least to said power demand indicative signal for varying a reduction ratio of the continuously variable transmission in such a predetermined pattern that if the direction of a present change in the power demand is different from the direction of the prior change and the present change is less than a predetermined value, this present change does not cause any change in the reduction ratio.

2. A ratio control system of a continuously variable transmission for an automotive vehicle having an engine drivingly coupled with the continuously variable transmission, comprising:
   a sensor means for sensing a power demand on the engine and generating a power demand indicative sensor output signal; and
   control means responsive at least to said power demand indicative sensor output signal for varying a reduction ratio of the continuously variable transmission in such a predetermined pattern that there is a difference between the increasing power demand and the decreasing power demand that effect the same reduction ratio established in the continuously variable transmission, and if the direction of a present change in the power demand is different from the direction of the prior change and the present change is less than a predetermined value, this present change does not cause any change in the reduction ratio.

3. A ratio control system as claimed in claim 2, wherein said sensor means is a throttle opening degree sensor designed to detect a throttle opening degree of the engine throttle.

4. A ratio control system as claimed in claim 2, wherein said control means includes a non-linear control element which provides a hysteresis with a hysteresis width.

5. A ratio control system as claimed in claim 4, wherein said predetermined value is equal to said hysteresis width.

6. A ratio control system of a continuously variable transmission for an automotive vehicle having an engine drivingly coupled with the continuously variable transmission, comprising:
   a sensor means for sensing a power demand on the engine and generating a power demand indicative sensor output signal;
   a sensor means for sensing a vehicle speed of the automotive vehicle and generating a vehicle speed indicative sensor output signal; and
   control means responsive to said power demand indicative sensor output signal and said vehicle speed indicative sensor output signal for varying a reduction ratio of the continuously variable transmission in such a predetermined pattern that there is a difference between the increasing power demand and the decreasing power demand that effect the same reduction ratio established in the continuously variable transmission, and if the direction of a present change in the power demand is different from the direction of the prior change and the present change is less than a predetermined value, this present change does not cause any change in the reduction ratio;
   said control means including a non-linear control element which provides a hysteresis with a hysteresis width, said non-linear control element varying said hysteresis width in response to said vehicle speed indicative sensor output signal.

7. A method of controlling a reduction ratio of a continuously variable transmission for an automotive vehicle having an engine with a throttle, the method comprising the steps of:
   sensing a throttle opening degree of the engine throttle and generating a throttle opening degree indicative sensor output signal indicative of said opening degree of the throttle;
   repeating said sensing steps;
   judging the direction of a change in said throttle opening degree indicative sensor output signal;
   varying a reduction ratio of the continuously variable transmission in response to the result of said judging step in such a predetermined pattern that there is a difference between the increasing throttle opening degree and the decreasing throttle opening degree that effect the same reduction ratio established in the continuously variable transmission, and if the direction of a present change in the throttle opening degree is different from the direction of the prior change and the present change is less than a predetermined value, this present change does not cause any change in the reduction ratio;

sensing a vehicle speed of the automotive vehicle and generating a vehicle speed indicative sensor output signal; and varying said predetermined value in response to said vehicle speed indicative sensor output signal.

8. A method as claimed in claim 7, wherein said reduction ratio varying step includes a step of comparing a present value of said throttle opening degree indicative sensor output signal with a prior value of said throttle opening degree indicative sensor output signal.

9. A method as claimed in claim 7, wherein said reduction ratio varying step includes a step of comparing a present value of said throttle opening degree indicative sensor output signal with a predetermined value which has been determined in relation to a prior value of said throttle opening degree indicative sensor output value.

10. A ratio control system of a continuously variable transmission for an automotive vehicle having an engine drivingly coupled with the continuously variable transmission and an accelerator pedal manually operable to vary a power demand on the engine, comprising:

a sensor means for sensing the power demand on the engine and generating a power demand indicative sensor output signal; and control means responsive at least to said power demand indicative signal for varying a reduction ratio of the continuously variable transmission, said control means including means for converting said power demand indicative signal into a power demand indicative data signal in accordance with a predetermined schedule, means for determining a target value of a predetermined variable in response to said power demand indicative data signal, said predetermined variable being variable with variation of the reduction ratio of the continuously variable transmission, and means for varying the reduction ratio of the continuously variable transmission in such a direction as to reduce a difference between an actual value of said predetermined variable and said target value thereof toward zero, said power demand indicative data signal staying invariable as long as said power demand indicative signal is subject to a predetermined variation.

11. A method of controlling a reduction ratio of a continuously variable transmission for an automotive vehicle having an engine drivingly coupled with the continuously variable transmission and an accelerator pedal manually operable to vary a power demand on the engine, the method comprising the steps of:

sensing the power demand on the engine and generating a power demand indicative sensor output signal;

converting said power demand indicative signal into a power demand indicative data signal in accordance with a predetermined schedule;

determining a target value of a predetermined variable in response to said power demand indicative data signal; said predetermined variable being variable with variation of the reduction ratio of the continuously variable transmission; and varying the reduction ratio of the continuously variable transmission in such a direction as to reduce a difference between an actual value of said predetermined variable and said target value thereof toward zero, said power demand indicative data signal staying invariable as long as said power demand indicative signal is subject to a predetermined variation.

12. A system for controlling a reduction ratio of a continuously variable transmission for an automotive vehicle having an engine drivingly coupled with the continuously variable transmission and an accelerator pedal manually operable to vary a power demand on the engine, the method comprising the steps of:

means for sensing the power demand on the engine and generating a power demand indicative sensor output signal;

means for converting said power demand indicative signal into a power demand indicative data signal in accordance with a predetermined schedule;

means for determining a target value of a predetermined variable in response to said power demand indicative data signal, said predetermined variable being variable with variation of the reduction ratio of the continuously variable transmission; and means for varying the reduction ratio of the continuously variable transmission in such a direction as to reduce a difference between an actual value of said predetermined variable and said target value thereof toward zero, said power demand indicative data signal staying invariable as long as said power demand indicative signal is subject to a predetermined variation.

* * * * *